UNITED STATES PATENT OFFICE.

CHARLES HENRY STEARN, OF WESTMINSTER, AND FRANK TRIST WOODLEY, OF PLUMSTEAD, ENGLAND.

MANUFACTURE OF FILAMENTS, SHEETS, OR FILMS FROM CELLULOSE.

SPECIFICATION forming part of Letters Patent No. 725,016, dated April 7, 1903.

Application filed February 3, 1903. Serial No. 141,733. (No specimens.)

*To all whom it may concern:*

Be it known that we, CHARLES HENRY STEARN, electrician, residing at 47 Victoria street, in the city of Westminster, England, and FRANK TRIST WOODLEY, electrician, residing at 235 Burrage road, Plumstead, in the county of Kent, England, subjects of the King of Great Britain and Ireland, have invented certain new and useful Improvements in the Manufacture of Filaments, Sheets, or Films from Cellulose, of which the following is a specification.

In the specifications of British Letters Patent granted to one of us, (Charles Henry Stearn)—viz., Nos. 1,020, 1,021, and 1,022, dated the 13th day of January, A. D., 1898—a process is described in which viscose is caused to flow into setting solutions, such as a solution of certain salts of ammonia, the reaction which takes place causing rapid solidification of the cellulose compound contained in the viscose in such form as to meet all the requirements for its continuous conversion into a filament, sheet, or film. Subsequent mechanical and chemical treatment brings the product to its final form. The viscose to which this process is applicable contains, in addition to the cellulose compound, (xanthate of cellulose,) the alkaline by-products, chiefly sodium carbonate and sulfo carbonates, resulting from the interaction of the caustic soda and carbon bisulfid used in the original process of preparation of the viscose. By various processes, which have been described and are now well known, the said cellulose compound can be separated in an insoluble condition from the viscose solution, and thereby freed from the saline by-products. The xanthate of cellulose thus precipitated and purified can be redissolved (according to its composition) in water or in caustic-soda solution. The purified viscose thus obtained preserves the characteristic features of the original solution; but during the process of purification the xanthate of cellulose changes in composition and properties in such a way that it is precipitated by even the weakest acids, whereas the original viscose may be treated with certain weak acids—for instance, with acetic acid—in excess without causing the separation of the xanthate of cellulose. We have now found that the precipitation or solidification of the cellulose compound from this modified and purified form of viscose by treatment of the same with acid answers all the requirements of the process for the preparation of artificial cellulose threads, sheets, or films, whereas in the case of crude viscose an acid-bath for solidifying the cellulose compound is altogether inapplicable by reason of the effervescence caused by the escape of gaseous and volatile compounds and the liberation and deposition of sulfur upon and within the product. This is the basis of our present invention. The following are examples of treatment by which it can be performed in practice.

The crude viscose is treated by one of the several methods for isolating the dissolved xanthate of cellulose—for example, first, treatment with saturated brine or a solution of an ammonium compound and washing with diluted brine until free from alkaline by-products; second, treatment with a weak acid, such as acetic acid, followed, if necessary, by the addition of brine and washing. The xanthate of cellulose is redissolved in alkaline lye or in water at ordinary temperature, according to its composition and properties, the proportion of alkali—say caustic soda—when it is necessary to use it being such as to render the solution homogeneous and of the requisite degree of fluidity. The solution is preferably used in such a condition that the cellulose is entirely precipitated by a weak acid, such as acetic acid. To secure this condition after the compound has been redissolved in alkali, as hereinbefore described, it sholud be kept for some time at a constant temperature until the condition is attained as the result of spontaneous change. The time required will vary with the conditions; but usually it will be sufficient to keep the solution for from one to three days at a temperature of from 15° to 20° centigrade. The solution may be manipulated in exactly the same manner as crude viscose up to the point of reaching the orifices through which it is squirted. In the precipitating-bath we employ an acid of a kind or composition and concentration in accordance with the composition of the viscose and the effect required to be produced. Thus aqueous sulfuric acid containing about nine per cent. $H_2SO_4$ or hydrochloric acid containing about seven per cent. HCl—that is, of about twice normal strength—or acetic acid of from ten to twenty per cent. real acid $(C_2H_4O_2)$ may be taken at the outset and be maintained at this acid strength by further additions of more concentrated acid, *pari passu* with the neutralization of the viscose by the alkali. The bath is preferably used cold—that is, at ordinary temperature—say about 10° to 20° centigrade. Instead of using an acid as such for the bath an acid compound which by solution in water is in part decomposed (hydrolized) and liberates an acid may be used—such, for instance, as sulfate of alumina or of chromium or the like.

Having now particularly described and ascertained the nature of the said invention and in what manner the same is to be performed, we declare that what we claim is—

1. In the formation of filaments, sheets, or films, of cellulose from viscose freed from decomposable by-products, the use of an acid, (or a compound which will liberate an acid as aforesaid) in the precipitating-bath.

2. In the formation of filaments, sheets, or films, from purified solutions of xanthate of cellulose, the use of an acid, (or a compound which will liberate an acid as aforesaid) as the precipitating agent.

3. The process of forming filaments, sheets or films of cellulose from crude viscose which consists in purifying the viscose in bulk, then forming it into filaments, sheets or films, and then treating said filaments, sheets or films in a precipitating acid-bath.

4. The process of forming filaments, sheets or films of cellulose from crude viscose which consists in isolating the xanthate of cellulose, dissolving the xanthate of cellulose, then allowing it to stand at an approximately constant temperature, then forming it into filaments, sheets or films, and then treating it in a precipitating-bath containing an acid or a compound which will liberate an acid.

5. The process of forming filaments, sheets or films of cellulose from crude viscose which consists in isolating the xanthate of cellulose, then dissolving it in an alkaline solution, then forming it into filaments, sheets or films, and treating said filaments, sheets or films in a precipitating acid-bath.

6. The process of forming filaments, sheets or films of cellulose which consists in subjecting purified viscose to the action of caustic alkali for a suitable time, at an approximately constant temperature, then forming it into filaments, sheets or films, and then treating it in a precipitating acid-bath.

In testimony whereof we affix our signatures in presence of two witnesses.

CHARLES HENRY STEARN.
FRANK TRIST WOODLEY.

Witnesses as to the signature of Charles Henry Stearn:
WILLIAM JOHN WEEKS,
PERCY READ GOLDRING.

Witnesses as to the signature of Frank Trist Woodley:
JAMES H. BELL,
JOS. C. FRALEY.